United States Patent
Siddiqui et al.

(10) Patent No.: US 9,975,405 B2
(45) Date of Patent: May 22, 2018

(54) MODULAR AIR GRILL ASSEMBLY

(71) Applicant: Dometic Corporation, Louisville, KY (US)

(72) Inventors: Faisal Siddiqui, LaGrange, IN (US); Bryan Bergin, Granger, IN (US)

(73) Assignee: Dometic Corporation, Louisville, KY (US)

( * ) Notice: Subject to any disclaimer, the term of this patent is extended or adjusted under 35 U.S.C. 154(b) by 1372 days.

(21) Appl. No.: 13/827,604

(22) Filed: Mar. 14, 2013

(65) Prior Publication Data

US 2014/0260393 A1    Sep. 18, 2014

(51) Int. Cl.
*B60H 1/34*    (2006.01)
*B60H 1/00*    (2006.01)

(52) U.S. Cl.
CPC ....... *B60H 1/3407* (2013.01); *B60H 1/00364* (2013.01); *B60H 2001/00235* (2013.01)

(58) Field of Classification Search
CPC ...................................................... B60H 1/34
USPC ...................................................... 454/136
See application file for complete search history.

(56) References Cited

U.S. PATENT DOCUMENTS

| | | |
|---|---|---|
| 964,146 A | 7/1910 | Clark |
| RE24,637 E | 4/1959 | Wulle |
| 3,092,009 A | 6/1963 | Goettl |
| 3,115,082 A | 12/1963 | Sanoff |
| 3,528,359 A | 9/1970 | Sand |
| 3,680,468 A | 8/1972 | Schueler |
| D226,381 S | 2/1973 | Harty |
| 3,727,537 A | 4/1973 | Harty |
| 3,867,486 A | 2/1975 | Nagele |
| 3,974,755 A | 8/1976 | Honmann |
| 4,189,987 A | 2/1980 | Amberg et al. |
| D257,637 S | 12/1980 | Armbruster |
| 4,502,368 A | 3/1985 | Hempel |
| 4,502,467 A | 3/1985 | Smith |
| 4,550,648 A | 11/1985 | Eagle |
| D284,025 S | 5/1986 | Armstrong |
| 4,608,834 A | 9/1986 | Rummer |
| 4,637,299 A | 1/1987 | Harding |
| 4,641,502 A * | 2/1987 | Aldrich .............. B60H 1/00378 454/136 |
| 4,665,804 A | 5/1987 | Muyasaka |

(Continued)

FOREIGN PATENT DOCUMENTS

| | | |
|---|---|---|
| AU | 3067405 | 3/2016 |
| AU | 201612249 | 4/2016 |

(Continued)

OTHER PUBLICATIONS

International Search Report for corresponding application PCT/US2013/065458 dated Jan. 29, 2014.

(Continued)

*Primary Examiner* — Steven B McAllister
*Assistant Examiner* — Samantha Miller
(74) *Attorney, Agent, or Firm* — Middleton Reutlinger

(57) ABSTRACT

A modular air grill is taught having a removable return register and a removable supply register. The supply register may be replaced with a blank when adequate cooling or rapid cooling has occurred and the cooling through the ducts is desired rather than immediately adjacent to an air conditioning unit.

14 Claims, 8 Drawing Sheets

(56) References Cited

U.S. PATENT DOCUMENTS

| | | | |
|---|---|---|---|
| 4,672,818 A | 6/1987 | Roth | |
| 4,690,040 A * | 9/1987 | Barnett | B60J 7/1642 454/136 |
| 4,693,174 A | 9/1987 | Anderson | |
| 4,709,623 A | 12/1987 | Roth et al. | |
| D296,583 S | 7/1988 | Barradas | |
| 4,760,773 A | 8/1988 | Pezzulli | |
| D300,777 S | 4/1989 | Bales et al. | |
| D306,341 S | 2/1990 | Bales et al. | |
| 5,056,262 A | 10/1991 | Schweiss et al. | |
| 5,176,570 A | 1/1993 | Liedl | |
| D343,894 S | 2/1994 | Anderson | |
| 5,307,645 A * | 5/1994 | Pannell | B60H 1/00364 454/144 |
| 5,366,149 A | 11/1994 | Kline | |
| 5,403,183 A | 4/1995 | Andersson et al. | |
| D360,681 S | 7/1995 | Chopko | |
| 5,435,781 A | 7/1995 | Kitchens | |
| D367,524 S | 2/1996 | Waldschmidt | |
| 5,494,244 A | 2/1996 | Walton | |
| 5,501,634 A * | 3/1996 | Wilder | B60H 1/00378 454/109 |
| 5,531,641 A | 7/1996 | Aldrich | |
| 5,556,335 A | 9/1996 | Holyoake | |
| 5,588,910 A | 12/1996 | Hutter et al. | |
| 5,632,156 A | 5/1997 | Takeo et al. | |
| 5,643,081 A | 7/1997 | Klein | |
| D391,632 S | 3/1998 | Thomas | |
| 5,727,998 A | 3/1998 | Kreuger et al. | |
| 5,752,877 A | 5/1998 | Sun | |
| 5,765,383 A | 6/1998 | Inoue | |
| 5,860,856 A | 1/1999 | Teich et al. | |
| 5,863,310 A | 1/1999 | Brown et al. | |
| 5,964,910 A | 10/1999 | Keele | |
| D424,184 S | 5/2000 | Chang-Kwon | |
| 6,066,041 A | 5/2000 | Hernandez et al. | |
| 6,073,456 A | 6/2000 | Kawai et al. | |
| 6,076,370 A | 6/2000 | Da Silva | |
| D428,480 S | 7/2000 | Flanagan | |
| 6,101,829 A | 8/2000 | Robinson | |
| 6,149,513 A | 11/2000 | Lyu | |
| D435,639 S | 12/2000 | Slavonia et al. | |
| 6,171,062 B1 | 1/2001 | Bucher et al. | |
| D437,396 S | 2/2001 | Flanagan | |
| 6,196,914 B1 | 3/2001 | Lyu | |
| 6,234,893 B1 | 5/2001 | Meredith | |
| 6,241,794 B1 | 6/2001 | Jadran et al. | |
| 6,250,373 B1 * | 6/2001 | Vecchi | F24F 1/0007 165/125 |
| 6,257,976 B1 | 7/2001 | Richardson, III | |
| 6,302,780 B1 | 10/2001 | Ahn et al. | |
| 6,339,934 B1 | 1/2002 | Yoon et al. | |
| D454,625 S | 3/2002 | Flanagan | |
| 6,351,957 B2 | 3/2002 | Hara | |
| 6,367,270 B2 | 4/2002 | Niimi et al. | |
| 6,370,899 B1 | 4/2002 | Hobbs et al. | |
| 6,370,906 B1 | 4/2002 | Kuo | |
| 6,415,622 B2 | 7/2002 | Kim et al. | |
| 6,536,222 B1 | 3/2003 | Ahn et al. | |
| 6,554,880 B1 | 4/2003 | Northcutt | |
| 6,571,572 B2 | 6/2003 | Hobbs et al. | |
| 6,601,356 B2 | 8/2003 | Snyder | |
| 6,616,523 B1 | 9/2003 | Tani et al. | |
| 6,626,003 B1 | 9/2003 | Kortum et al. | |
| 6,745,586 B1 | 6/2004 | Reimann et al. | |
| D495,041 S | 8/2004 | Thomas | |
| 6,814,660 B1 | 11/2004 | Cavett | |
| 6,857,953 B2 | 2/2005 | Malott | |
| 6,889,762 B2 | 5/2005 | Zeigler et al. | |
| 7,086,740 B2 | 8/2006 | Sample et al. | |
| 7,140,192 B2 | 11/2006 | Allen et al. | |
| 7,171,822 B2 | 2/2007 | Allen et al. | |
| D538,413 S | 3/2007 | Lyu | |
| 7,201,010 B2 | 4/2007 | Homan et al. | |
| D541,917 S | 5/2007 | Pfeiffer | |
| 7,234,315 B2 | 6/2007 | Allen et al. | |
| 7,237,397 B2 | 7/2007 | Allen | |
| D554,544 S | 11/2007 | Englert | |
| D560,785 S | 1/2008 | Galeazzi | |
| 7,316,119 B2 | 1/2008 | Allen | |
| 7,334,834 B2 | 2/2008 | Hill et al. | |
| 7,441,414 B2 | 10/2008 | Ziehr et al. | |
| 7,448,227 B2 | 11/2008 | Zeigler et al. | |
| 7,454,922 B2 | 11/2008 | Zeigler et al. | |
| 7,591,143 B2 | 9/2009 | Zeigler et al. | |
| 7,591,303 B2 | 9/2009 | Zeigler et al. | |
| D619,151 S | 7/2010 | Tsuji | |
| 7,797,958 B2 | 9/2010 | Alston et al. | |
| 7,832,221 B2 | 11/2010 | Wijaya et al. | |
| D629,094 S | 12/2010 | Thomas | |
| 7,845,187 B2 | 12/2010 | Patel et al. | |
| 7,934,387 B2 | 5/2011 | Lee et al. | |
| 7,963,117 B2 | 6/2011 | Allen et al. | |
| 8,015,833 B2 | 9/2011 | Cikanek et al. | |
| 8,096,482 B2 | 1/2012 | Dage | |
| 8,171,866 B2 | 5/2012 | Dunstan | |
| D661,386 S | 6/2012 | Bergin | |
| 8,249,749 B2 | 8/2012 | Dage et al. | |
| D672,450 S | 12/2012 | Milks et al. | |
| 8,453,722 B2 | 6/2013 | Zeigler et al. | |
| 8,535,127 B2 | 9/2013 | Malott | |
| 8,568,209 B2 | 10/2013 | Boxum | |
| D712,531 S | 9/2014 | Bergin | |
| D715,907 S | 10/2014 | Bergin | |
| D716,925 S | 11/2014 | Bergin | |
| D782,939 S | 4/2017 | Allard et al. | |
| 9,631,832 B2 | 4/2017 | Malott | |
| D785,771 S | 5/2017 | Bergin et al. | |
| D785,772 S | 5/2017 | Bergin | |
| 2001/0053668 A1 | 12/2001 | Berger | |
| 2003/0162492 A1 | 8/2003 | Caferro et al. | |
| 2003/0220070 A1 | 11/2003 | Orendorff et al. | |
| 2004/0005854 A1 | 1/2004 | Shin | |
| 2004/0038643 A1 | 2/2004 | Katagiri et al. | |
| 2004/0072532 A1 | 4/2004 | Cho | |
| 2004/0127152 A1 * | 7/2004 | Malott | B60H 1/00364 454/136 |
| 2005/0087332 A1 | 4/2005 | Umeo et al. | |
| 2005/0227609 A1 | 10/2005 | Koessler | |
| 2006/0026936 A1 | 2/2006 | Paumier et al. | |
| 2006/0052050 A1 | 3/2006 | Malott et al. | |
| 2006/0083889 A1 | 4/2006 | Schuckers | |
| 2007/0000265 A1 | 1/2007 | McEnaney et al. | |
| 2007/0066215 A1 * | 3/2007 | Song | B01D 46/0004 454/329 |
| 2007/0131408 A1 | 6/2007 | Zeigler et al. | |
| 2007/0157522 A1 | 7/2007 | Hebert et al. | |
| 2007/0227693 A1 | 10/2007 | Allen et al. | |
| 2007/0287374 A1 | 12/2007 | Day et al. | |
| 2007/0298702 A1 * | 12/2007 | Boxum | B60H 1/00364 454/129 |
| 2007/0299560 A1 | 12/2007 | LaHue et al. | |
| 2008/0014852 A1 | 1/2008 | Mielke et al. | |
| 2008/0034767 A1 | 2/2008 | Ziehr et al. | |
| 2008/0146136 A1 * | 6/2008 | Degutis | B61D 17/16 454/83 |
| 2009/0098820 A1 * | 4/2009 | Yabu | F24F 1/0011 454/333 |
| 2010/0089563 A1 | 4/2010 | Sundhar | |
| 2010/0224754 A1 | 9/2010 | Khan | |
| 2011/0016894 A1 | 1/2011 | Lemon et al. | |
| 2011/0067420 A1 | 3/2011 | Alston et al. | |
| 2011/0302942 A1 | 12/2011 | Birchard | |
| 2012/0210733 A1 | 8/2012 | Kolavennu et al. | |
| 2012/0247131 A1 | 10/2012 | Esch | |
| 2012/0324927 A1 | 12/2012 | Suzuki | |
| 2013/0047648 A1 | 2/2013 | Zeigler et al. | |
| 2013/0109294 A1 | 5/2013 | Tolinski et al. | |
| 2013/0157557 A1 | 6/2013 | Malott | |
| 2013/0205811 A1 | 8/2013 | Esch | |
| 2014/0033742 A1 | 2/2014 | Esch | |
| 2014/0188313 A1 | 7/2014 | Huang | |
| 2014/0223928 A1 | 8/2014 | Esch | |
| 2014/0260393 A1 | 9/2014 | Siddiqui | |

(56) References Cited

U.S. PATENT DOCUMENTS

| | | | |
|---|---|---|---|
| 2015/0087216 A1* | 3/2015 | Stover | B60H 1/245 454/75 |
| 2015/0107814 A1 | 4/2015 | Jeong | |
| 2015/0251521 A1 | 9/2015 | Brauer et al. | |
| 2015/0352924 A1 | 12/2015 | Allard | |
| 2016/0076271 A1 | 3/2016 | Reinking | |
| 2016/0207372 A1 | 7/2016 | Parry | |

FOREIGN PATENT DOCUMENTS

| | | |
|---|---|---|
| AU | 201613590 | 7/2016 |
| AU | 201613591 | 7/2016 |
| AU | 201613592 | 7/2016 |
| AU | 201613593 | 7/2016 |
| AU | 201712794 | 5/2017 |
| AU | 201712798 | 5/2017 |
| CA | 1011592 | 6/1977 |
| CA | 167431 | 3/2016 |
| CA | 172872 | 3/2016 |
| CA | 172873 | 3/2016 |
| CA | 172874 | 3/2016 |
| CA | 165232 | 5/2016 |
| CA | 165233 | 5/2016 |
| CN | 201630322524.2 | 4/2017 |
| EP | 0180053 | 10/1985 |
| EP | 0064769 | 8/1986 |
| EP | 1681517 | 7/2006 |
| EP | 1832452 | 9/2007 |
| EP | 003323740 | 7/2016 |
| EP | 003421643 | 10/2016 |
| EP | 003479179 | 11/2016 |
| FR | 2087220 | 12/1971 |
| GB | 2297157 | 7/1996 |
| JP | 52137854 | 11/1977 |
| JP | 2004125338 | 4/2004 |
| KR | 2005119747 A * | 12/2005 |
| WO | 2004099681 | 11/2004 |
| WO | 2014143181 | 9/2014 |
| WO | 15134185 | 9/2015 |

OTHER PUBLICATIONS

American RV Company, Dometic 459530 Duo Therm 13,500 BTU Brisk Air Conditioner High Efficiency Upper Unit Trailer Camper RV, Mar. 23, 2014 https://web.archive.org/web/20140323013456/ http://www.americanrvcompany.com/Dometic-459530-Duo-Therm-13500-BTU-Brisk-Air-Conditioner-High-Efficiency-Upper-Unit-Trailer-Camper-RV Mar. 23, 2014.

American RV Company, Dometic 541815 High Performance 13,500 BTU Air Conditioner Upper Unit CCC2 Required Electronics Pre-Installed Camper Trailer RV, http://www.americanrvcompany.com/Dometic-541815-High-Performance-13500-BTU-Air-Conditioner-Upper-Unit-CCC2-Required-Electronics-Pre-Installed-Camper-Trailer-RV Mar. 23, 2014.

American RV Company, Dometic 541816 High Performance 15,000 BTU Air Conditioner Upper Unit CCC2 Required Electronics Pre-Installed Camper Trailer RV, http://www.americanrvcompany.com/Dometic-541816-High-Performance-15000-BTU-Air-Conditioner-Upper-Unit-CCC2-Required-Electronics-Pre-Installed-Camper-Trailer-RV Mar. 23, 2014.

American RV Company, Dometic 541916 High Performance 15,000 BTU Air Conditioner Upper Unit Single Zone LCD Thermostat Required Electronics Pre-Installed Camper Trailer RV, http://www.americanrvcompany.com/Dometic-541916-High-Performance-15000-BTU-Air-Conditioner-Upper-Unit-Single-Zone-LCD-Thermostat-Required-Electronics-Pre-Installed-Camper-Trailer-RV Mar. 23, 2014.

Australian Patent Application 2017220186 entitled "Parking Cooler" filed Jan. 11, 2017.

Chinese Patent Application 201710040123.1 entitled "Parking Cooler" filed Jan. 18, 2017.

European Patent Application 17152275.8 entitled "Parking Cooler" filed Jan. 19, 2017.

Dirna Bergstrom: Parking Coolers—No-Idle Electrical A/C—MiniCool Compact 1.4; http://www.dirna.com/parking-coolers-no-idle-electrical-ac-compact/ Mar. 17, 2015.

Dirna Bergstrom: Slim Cool; http://www.dirna.com/files/dirna-manuals/220RE00183.pdf May 21, 2014.

Dometic Corporation, Dometic High Performance Air Conditioners, 2 pages, Jan. 1, 2011.

Dometic Group: "Climate Control", http://www.dometic.com/enus/Americas/USA/RV-Products/climate, 2 pages.

Dometic Waeco Coolair RT 880; http://www.dometic.co.uk/product/waeco-coolair-rt-880-2/ May 14, 2015.

Eberspacher Cooltronic Parking Coolers with High Efficiency with the Engine Off; http://www.eberspacher.com/products/air-conditioning/cooltronic-truck-parking-coolers.html Jun. 23, 2015.

European Design Patent Application No. 003300219 entitled "Air Shroud Assembly" filed Jul. 8, 2016.

Indelb; WO Oblo'; Sleeping Well Oblo; http://www.indelb.com/products/parking_air_cooler/sleeping_well/sw_oblo Apr. 1, 2016.

Design U.S. Appl. No. 29/552,019 entitled "Air Shroud Assembly" dated Jan. 19, 2016.

Design U.S. Appl. No. 29/573,473 entitled "Recreational Vehicle Air-Conditioning Unit" filed Aug. 5, 2016.

Design U.S. Appl. No. 29/581,176 entitled "Air-Conditioning Unit" filed Oct. 17, 2016.

Design U.S. Appl. No. 29/594,476 entitled "Shroud Assembly" filed Feb. 17, 2017.

American RV Company, Dometic 551816 High Performance 15,000 BTU Heat Pump for Comfort Control Center II Camper Trailer RV, http://www.americanrvcompany.com/Dometic-551816-High-Performance-15000-BTU-Heat-Pump-for-Comfort-Control-Center-II-Camper-Trailer-RV Mar. 23, 2014.

Design U.S. Appl. No. 29/604,433 entitled "Air Conditioning Apparatus" filed May 17, 2017.

Design U.S. Appl. No. 15/407,709 entitled "Parking Cooler" filed Jan. 17, 2017.

Webasto: Rooftop air conditioning systems: Rooftop 3.5-9.9 kw; http://www.eberspacher.com/products/air-conditioning/cooltronic-truck-parking-coolers.html May 14, 2014.

Webasto; Truck parking cooler: Cool Top Vario 10 E; http://www.webasto.com/gb/markets-products/truck/air-conditioning/products/cool-top-vario/ Apr. 25, 2016.

Youtube; Viesa Kompressor; https://www.youtube.com/watch?v=SPK17XEvVL0 May 22, 2012 (https://www.google.com/?gws_rd=ssl#q=https://www.youtube.com/watch?v%3DSPK17XEvVL0&spf=1495819902591) May 22, 2012.

Design U.S. Appl. No. 29/542,555 entitled "Modular Air Grill Design" filed Oct. 15, 2015.

Chinese Patent Application 201730179867.2 entitled "Air conditioning apparatus Ventilation and air conditioning equipment" filed May 16, 2017.

Canadian Patent Application 2,906,348 as filed Sep. 14, 2016 (national stage entry date).

10-Minute Tech, Trailer Life, Jul. 1996, pp. 69-70.

Dometic Duo-Therm, p. 140.

Canadian Intellectual Property Office, Office Action for related Canadian Application No. 167431 dated Oct. 8, 2016.

Transmittal Letter of Related Cases dated May 3, 2017.

* cited by examiner

MODULAR AIR GRILL ASSEMBLY

STATEMENT REGARDING FEDERALLY SPONSORED RESEARCH

None.

REFERENCE TO SEQUENTIAL LISTING, ETC.

None.

CLAIM TO PRIORITY

None.

BACKGROUND

1. Field of the Invention

Present embodiments relate to a modular air grill assembly for a recreational vehicle (RV), building or marine use. More specifically, present embodiments relate to a modular air grill assembly for use with an air conditioning system of an RV, building or other marine structure having an exterior AC unit and an air grill disposed on an interior surface of a ceiling.

2. Description of the Related Art

"Recreational vehicle" generally refers to mobile home, motor homes, travel trailers, fifth wheels, recreational vans and the like. RVs, boats and some static building structures utilize ducting systems which pass between the roof and ceiling structure of the building, RV or water craft, for example. An air conditioning unit is typically disposed on a roof of the RV and duct passes between the ceiling and roof line to various registers disposed about the RV, water craft or building. The ducts are disposed to move air throughout the RV, for example, so as to discharge conditioned air into various areas and/or rooms. These systems are typically designed to cool the various areas equally.

However, when first starting an RV, for example, after a long period of non-use, it is often desirable to cool a particular area of the RV where occupants may be primarily located. This may include, but is not limited to, a primary living space or galley of the vehicle. Since air conditioning systems for RVs are designed to cool the interior of the vehicle equally, existing systems do not allow a particular area to be cooled more rapidly than other areas. One option is to provide an air conditioning unit capable of quickly cooling the entire interior of the recreational vehicle. However, weight and size limitations preclude such use, generally, from being effectively implemented into an RV usage.

Accordingly, it would be desirable to overcome these and other deficiencies with cooling systems for RVs, water craft and other static structures to cool a specific area rapidly in one scenario while in an alternate scenario, providing equal cooling throughout the entire vehicle or structure.

SUMMARY

According to some embodiments, a modular air grill assembly for use with an air conditioning system, having a roof-mounted air conditioning unit, comprises, a ceiling template capable of mounting at a ceiling opening of an RV, the ceiling opening defining a lower boundary of a plenum extending between the ceiling and the roof, said plenum defining a flow communication path between said air conditioning unit and said lower boundary, the ceiling template having a first opening, a second opening and a divider wall, the first opening being in fluid communication with a supply of the air conditioning unit and the second opening being in fluid communication with a return of the air conditioning unit, a modular air grill disposed on the ceiling over the plenum and engaging the ceiling template, the modular air grill having a first opening corresponding to the first opening of the template and a second opening corresponding to the second opening of the template, a first modular register which is positionable in the modular air grill corresponding to the first opening of the modular air grill and a modular blank which is positionable in the modular air grill corresponding to said first opening of said modular air grill. The modular air grill assembly, the first modular register and the modular blank being disposed generally perpendicular to air flow from the supply. The modular air grill assembly, the first modular register and the modular blank being disposed on a supply side of the plenum. The modular air grill assembly further comprising a modular return register. The modular air grill assembly further comprises a plurality of locking elements extending from the modular return register, from the first modular register and said modular blank. The modular air grill assembly further comprising a feature module disposed in one of the modular return registers, the modular blank and the first modular register. The modular air grill assembly wherein the features include at least one of communications feature, a light, a motion sensor, a motion sensor with light, an insect repellent material and an air purifier or freshener. The modular air grill assembly wherein the communication feature includes Bluetooth communications. The modular air grill assembly wherein the communication feature includes an electronic control panel. The modular air grill assembly wherein the communication feature includes an FM transmitter. The modular air grill assembly further comprises a plurality of hidden screw tabs covered by a first modular return register and one of the first modular register and the blank. The modular air grill assembly further comprises a plurality of louvers integrally molded in the first modular register. The modular air grill assembly wherein the first modular register is molded of a plastic material. The modular air grill assembly wherein the modular air grill is generally planar with a flange about a periphery thereof.

According to other embodiments, the modular air grill assembly comprises a template assembly including a base and at least one upstanding portion defining a supply side and a return side, the base including a supply opening and a return opening, a modular air grill including a frame having a supply side and a return side corresponding to the supply and return sides of said template assembly, a first modular grill interchangeable with a modular blank, the first modular grill and modular blank positionable to cover the supply side of the frame, the first modular grill having a plurality of louvers to allow fluid flow therethrough, the blank being solid to preclude fluid flow therethrough, the modular air grill assembly further comprising a return register on a return side of the frame. The modular air grill assembly wherein the first modular register is molded of a plastic material. The modular air grill assembly further comprising a plurality of louvers integrally molded in the first modular register. The modular air grill assembly wherein the first modular grill is sealed when the plurality of louvers are closed. The modular air grill assembly wherein said modular air grill is generally planar with a flange about a periphery thereof.

All of the above outlined features are to be understood as exemplary only and many more features and objectives of the modular air grill assembly may be gleaned from the disclosure herein. Therefore, no limiting interpretation of this summary is to be understood without further reading of the entire specification, claims, and drawings included herewith.

BRIEF DESCRIPTION OF THE DRAWINGS

In order that the embodiments may be better understood, embodiments of modular air grill assembly will now be described by way of examples. These embodiments are not to limit the scope of the claims as other embodiments of modular air grill will become apparent to one having ordinary skill in the art upon reading the instant description. Non-limiting examples of the present embodiments are shown in figures wherein:

DETAILED DESCRIPTION

Figure 1:
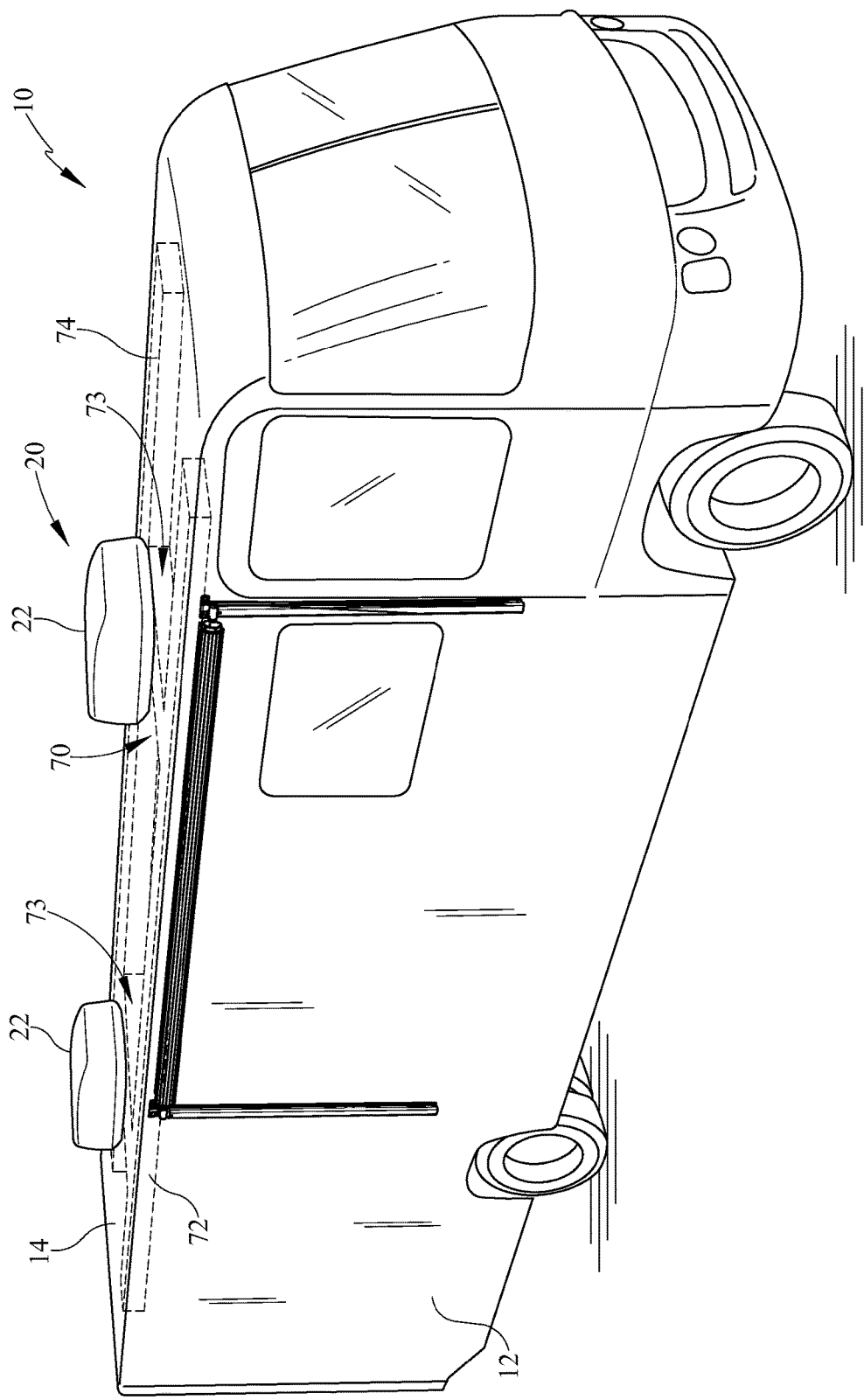
FIG. 1 is a perspective view of a recreational vehicle according to present embodiments.

It is to be understood that the modular air grill assembly is not limited in its application to the details of construction and the arrangement of components set forth in the following description or illustrated in the drawings. The assembly is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1 through 8 various embodiments of a modular air grill assembly which has modular parts to provide for quick cooling for a specific area according to one embodiment and equal dispersion of conditioned air in a second embodiment. The modular parts are interchangeable to provide for the first and second scenarios.

Referring now to FIG. 1, a perspective view of a recreational vehicle 10 is depicted. As used herein, the term "recreational vehicle" refers to mobile homes, motor homes, travel trailers, fifth wheels, recreational vans and the like. It should also be understood by one skilled in the art that the instant embodiment may be utilized with stationary structures having roof-mounted air conditioning units and air conditioning ducts extending through the ceiling area of the structure. Likewise, the embodiments of the instant disclosure are also suitable for use in various water crafts having exterior air conditioning units and duct work passing through cavities or spaces between the roof and ceiling. The depicted RV 10 includes a drive and transmission, not shown, as well as a sidewall 12 and a roof 14. Alternatively however, the RV may be in the form of a non-powered, pull-behind camper, non-mobile structures, and watercraft.

An air conditioning system 20 includes an air conditioning unit 22 disposed on the roof 14 and ducting 70 below the roof 14 but above the ceiling below to provide conditioned air to the interior of the vehicle 10. The air conditioning unit 22 may be mounted in a variety of fashions, including but not limited to, fasteners passing through the roof 14 through structural members, for example members 21 (FIG. 2) or through a template as discussed further herein.

On the roof 14 of the RV 10, a portion of the air conditioning system 20 is depicted. An air conditioning unit 22 is positioned along the roof line in at least one position. According to the instant embodiment, two air conditioning units 22 are utilized in two separate locations to provide conditioned air to the interior of the RV 10. The interior may be a single zone or may be broken up into various zones. The air conditioning unit 22 feeds a duct system 70 which is depicted in broken line. The duct system 70 includes, according to the instant embodiment, a first duct 72 which runs in a longitudinal direction parallel to the longitudinal axis of the vehicle 10 and a second parallel duct 74 which is parallel to the first duct on the opposite lateral side of the vehicle. These ducts 72, 74 are in fluid communication with the air conditioning units 22 so that interior air is conditioned by the units 22 and supplied or discharged to the interior of the vehicle to dehumidify the air therein. The air conditioning units 22 will be known to one skilled in the art and may include various models including, but not limited to, any of the Dometic Brisk, Penguin or High Performance series of air conditioning units, available from Dometic, Corp. having headquarters in Louisville, Ky. The first and second ducts 72, 74 may be formed of various configurations, cross-sections and may include more than two ducts in a variety of configurations. As described further herein, the first and second ducts 72, 74 are joined by central ducts 73 to define two H-shaped patterns for the air conditioning system 20. Additionally, while two air conditioning units 22 are shown, it is well within the scope of the present disclosure that a single air conditioning unit is utilized or more than two units be utilized. Such number will be a design characteristic based on the load capability of the air conditioning unit and the volume of the vehicle 10 being cooled.

Figure 2:
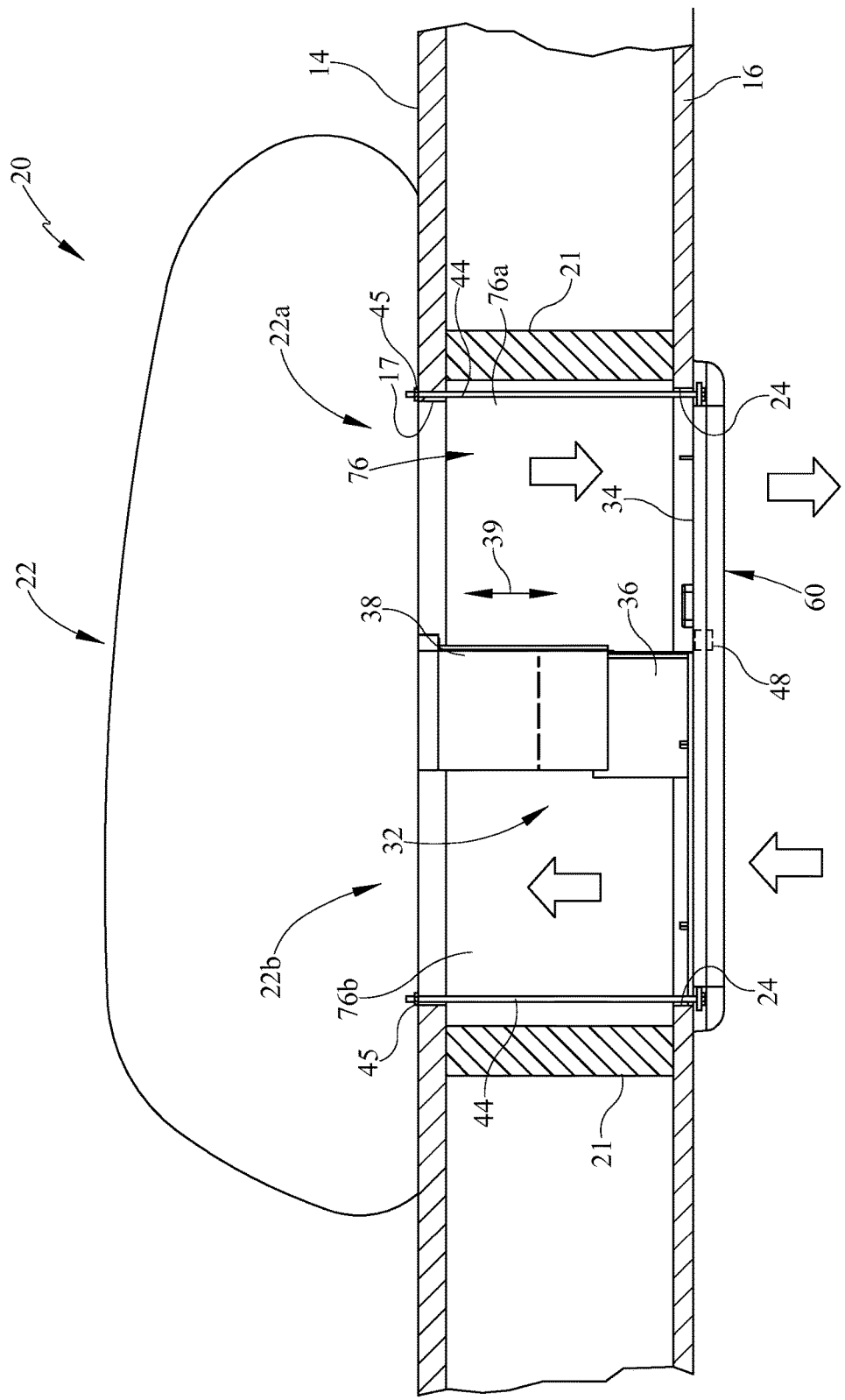
FIG. 2 is a side section view of the interface between the RV and air conditioning system.

Referring now to FIG. 2, a side section view of a portion of the air conditioning system 20 is depicted. The air conditioning system 20 is shown including one air conditioning unit 22 positioned on the roof 14. Spaced beneath the roof 14 is a ceiling 16 which defines an upper interior boundary of the vehicle 10. The roof 14 and the ceiling 16 may be separated by a plurality of ceiling supports 21 which may be formed of metal, wood, structural composites, or other known materials. The ceiling supports 21 also define a boundary of the plenum 76. A portion of the plenum 76 is in flow communication with the duct 73 (FIG. 1) and more particularly, a supply side 76a of the plenum 76 is in flow communication with the duct 73 while the return side of the plenum 76b is isolated from the duct 73. The ceiling supports 21 may also define the plenum 76 or alternatively the plenum 76 may be defined in part or in whole by sheet metal ducting. Additional structures may be utilized such as sheet metal, flexible foil or other material with some type of support structure or other material that may define the ducts 72, 74, 73 (FIGS. 1, 3) or the plenum 76. The ceiling 16 includes an opening 24 allowing flow communication with the interior of the vehicle. Along the roof 14 is a roof opening 17. The roof opening 17 allows for communication between the air conditioning unit 22 and the plenum 76. The plenum 76 is also in communication with the ceiling opening 24.

According to some embodiments, a gasket may be located between the air conditioning unit 22 and the roof 14. The roof opening 17 and ceiling opening 24 may be of square shape or rectangular shape, although various other shapes may be utilized corresponding to the shapes associated with openings in the template assembly 32, modular air grill 60 and the air conditioning unit 22. Further, the plenum 76 should be sealed in order to limit flow communication between the remaining space or cavity between the roof 14 and ceiling 16 and the plenum 76 extending therethrough between the first and second ducts 72, 74.

Opposite the air conditioning unit 22 and extending across the ceiling opening 24 is a ceiling template assembly 32. The template assembly 32 may be connected to the ceiling 16 of the vehicle and attached by, for instance, fasteners to the structural members 21. The ceiling template assembly 32 may also be used to mount the air conditioning unit 22 in addition to the roof 14 or independently thereof. The template assembly 32 includes a base 34, an upwardly extending wall 36 and a movable divider plate 38. The divider 38 and wall 36 divide and seal the plenum 76 into two portions, a supply side 76a, right of divider 38, and return side 76b, left of divider 38. The supply side 76a of the plenum is in flow communication with an outlet side of the evaporator 22a and the return side 76b is in flow communication with the inlet side of the evaporator 22b. A seal material 48 may be positioned on the lower surface of template assembly 32 between the assembly 32 and the modular grill 60. The seal 48 inhibits mixing of return air and supply air in the space between the components 32, 60.

Beneath the ceiling template assembly 32 and extending across the ceiling opening 24 is a modular air grill 60. The modular air grill 60 includes a frame 61 (FIG. 4) having two apertures, generally, 62, 64 (FIG. 4) which correspond to first and second apertures of the template assembly 32. As depicted in FIG. 2, the first or left side of the ceiling template 32 returns air from the RV interior into the air conditioning unit 22. The second side supplies conditioned air to the air conditioning unit 22 to the interior of the vehicle to establish a flow pattern of air into the RV 10 and out of the out of the RV 10. The template assembly 32 should be formed of a material having adequate strength to support the loads necessitated by the mounting configuration. According to some embodiments, the ceiling template 32 may be formed of sheet metal, for example sheet steel, aluminum or other lightweight metals.

Extending from the template base 34 to the air conditioning unit 22 are bolts 44. These bolts 44 fasten the air conditioning unit 22 to the template assembly. With brief reference to FIG. 4, bolt holes 46 are shown in the modular grill frame 61 and which are aligned with apertures 47 through the template assembly 32. The bolts 44 further extend into the air conditioning unit 22 and are retained therein by nut 45, for example.

Figure 3:
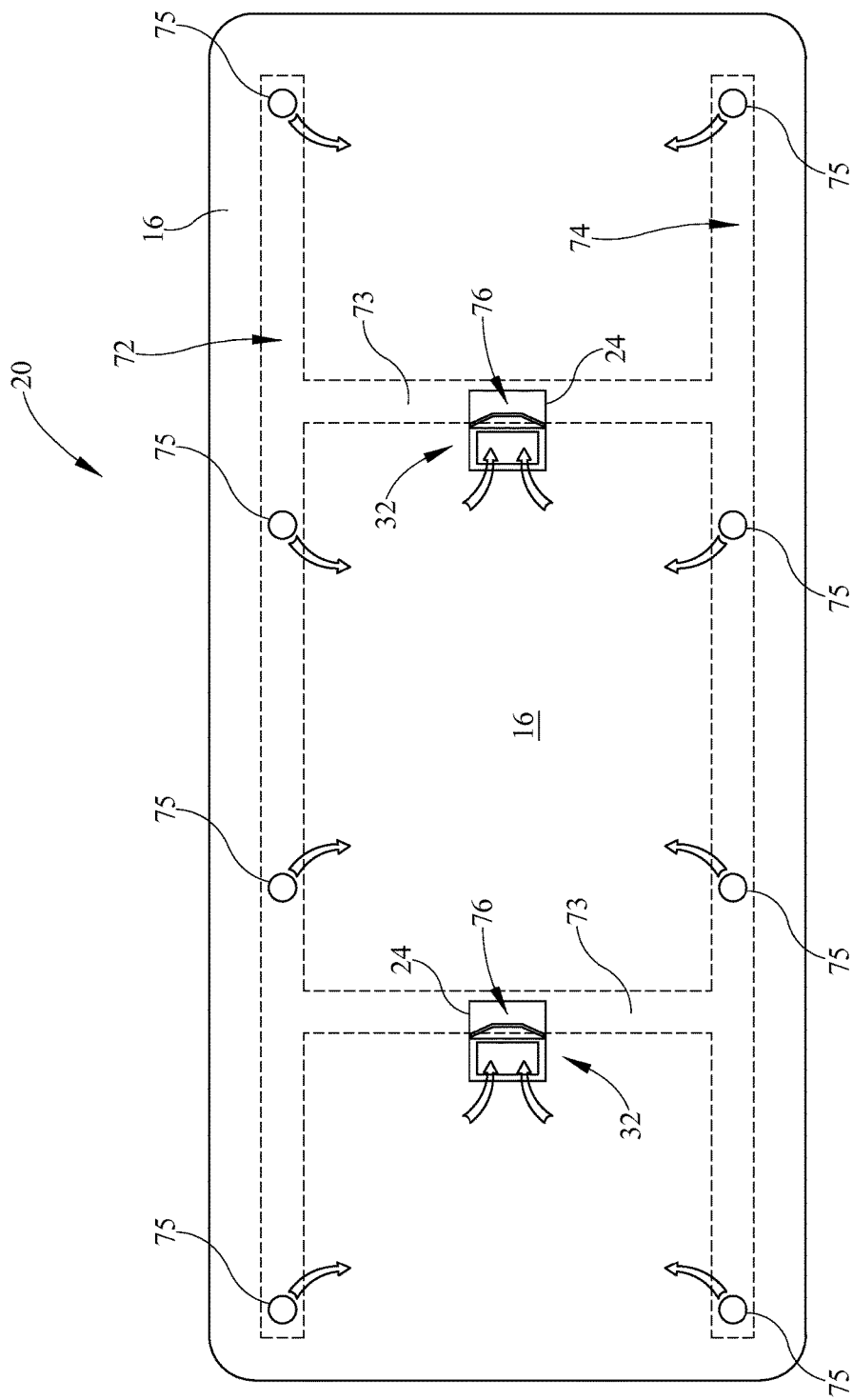
FIG. 3 is a bottom view of a portion of the air conditioning system.

Referring now to FIG. 3, a bottom view of the air conditioning system 20 is depicted from the interior of the vehicle. The system 20 includes the first duct 72 and the second duct 74 both of which are disposed between the roof 14 and the ceiling 16. The ducts 72, 74 are shown in broken line as they are above the ceiling line. This is better understood from FIGS. 1 and 2. Along the duct flow paths are a plurality of registers 75 which provide even cooling distribution throughout the vehicle. Centrally located in the plenum 76 are the ceiling template assembly 32. In operation, air conditioning units 22 are disposed on the roof of the vehicle and cause air flow from inside the vehicle to pass upwardly through the ceiling template assembly 32 for conditioning it within the air conditioning unit 22. After conditioning, the conditioned air passes through the plenum 76 and outwardly through the template assembly 32 into the interior of the vehicle. Alternatively, if the ceiling opening 24 (FIG. 2) is blocked, the air flow passes through the plenum 76 into the ducts 72, 74 and through the registers 75 to cool the entirety of the vehicle rather than the air space immediately beneath the template assembly 32. One skilled in the art should recognize that the modular air grill 60 (FIG. 2) is removed from this view for clarity. However, such air grills are positioned under the template assembly 32 so as to be disposed between the interior air space of the vehicle and the template assembly 32.

With reference to both FIGS. 2 and 3, the plenum 76 is generally divided into two portions. A first portion, for example right of the wall 36 and divider 38 is in fluid communication with duct portions 73. This first portion of the plenum 76a is also in fluid communication with the central duct 73 and between the air conditioning unit 22 and the interior of the vehicle to supply conditioned air to the interior. Further, a portion of the plenum 76b opposite the wall and divider 36, 38, for example on the left side, is not in fluid communication with ducts 72, 74, but allows return of air from the RV interior into the air conditioning unit 22. The first portion of the plenum 76a allows for air conditioned fluid flow to the RV interior, also referred to as supply air. A second portion of the plenum 76b removes air from the interior of the vehicle and to the air conditioning unit 22 for conditioning therein.

Figure 4:
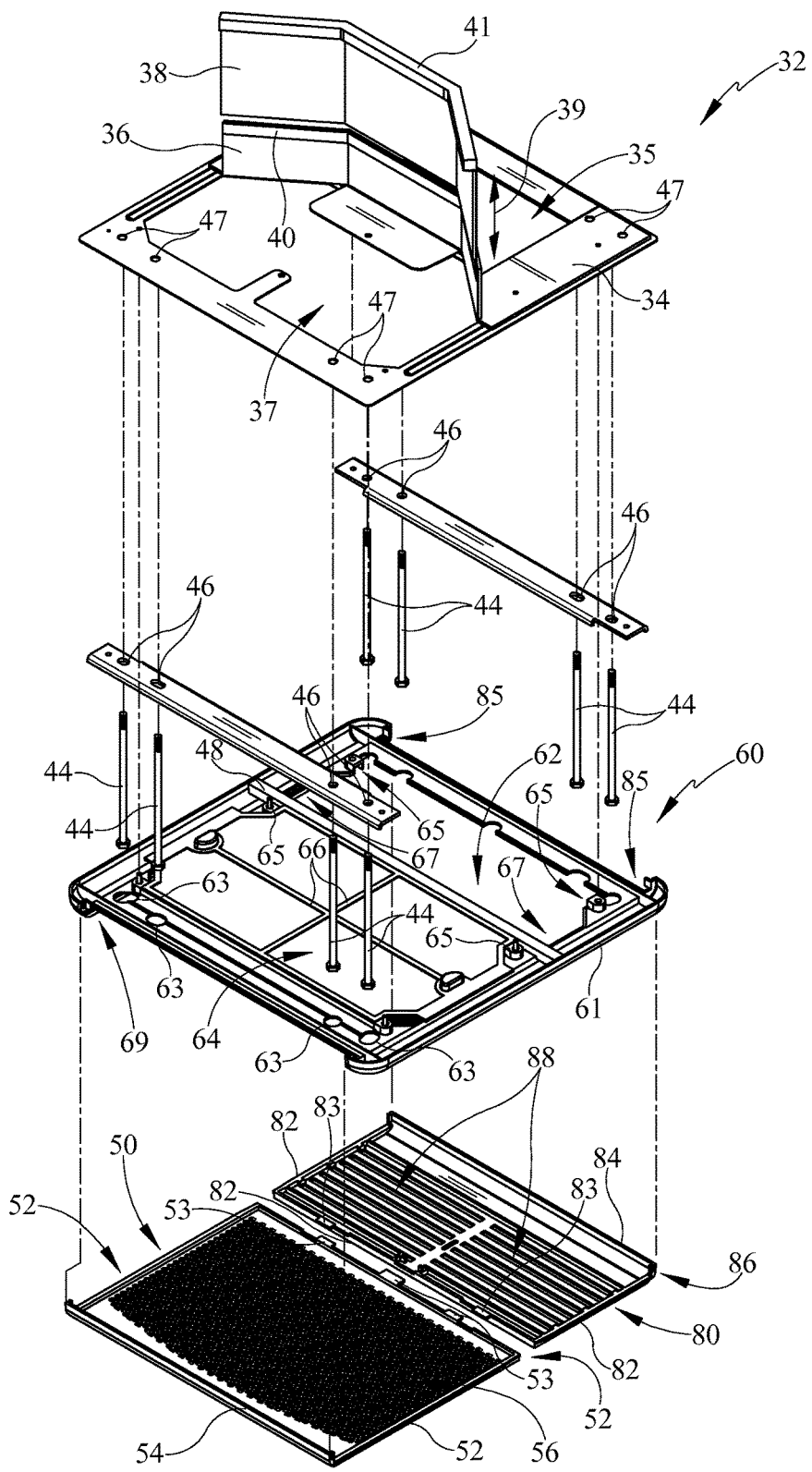
FIG. 4 is an exploded isometric view of a modular air grill assembly according to one embodiment.
Figure 5:
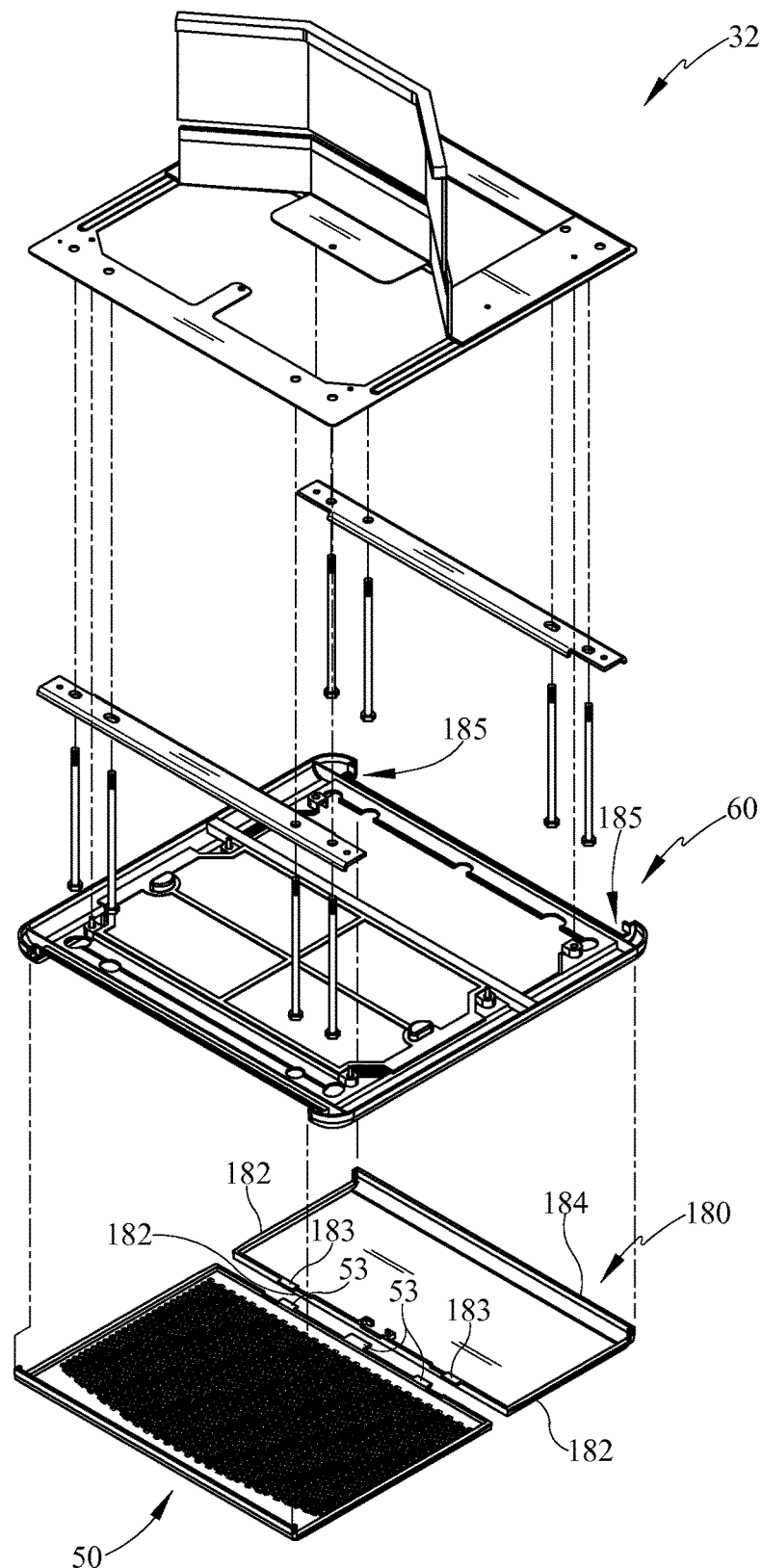
FIG. 5 is an exploded isometric view of a modular air grill assembly according to a second embodiment.

Referring now to FIG. 4, an exploded assembly view of the modular air grill assembly is depicted including the template assembly 32 and the modular air grill 60. The modular air grill 60 includes the frame 61, return grill 50, and supply grill 80 or blank 180 (FIG. 5). The ceiling template assembly 32 includes a base 34 which defines a general boundary to surround the periphery of the plenum 76. The base 34 may be one continuous part or formed of several parts, for example side rails and end rails, that are joined together, again for example by welding.

The ceiling template assembly 32 further includes an upwardly extending wall 36 that extends from the base 34. The upwardly extending wall 36 defines a first opening 35 and a second opening 37. The first opening 35 corresponds to the supply side of the plenum 76 allowing air to pass from the air conditioning unit into the RV 10. The second portion 37 receives return air from the interior of the vehicle and allows movement to the air conditioning unit 22 above the roof 14. The plenum 76 is divided into two volumes by the wall 36 and the divider 38. Along the upper edge of the upwardly extending wall 36 is two-sided tape 40. The divider wall 38 provides an amount of adjustability 39 between the upwardly extending wall 36 and the dividing wall 38. This is useful since the ceiling support height between roof line 14 and ceiling line 16 of various manufacturers of RVs, motor homes and the like may have different spacing therein. Accordingly, the adjustability 39 allows for easy adjustment to the varying heights at time of manufacture of the RV or other device 10. The tape 40 is utilized to retain the divider wall 38 at the desired position during installation for proper sealing of the plenum 76. The upper edge of the dividing wall 38 may include one or more pieces of sealing foam 41 which engages an upper edge of the plenum 76 when the dividing wall 38 is fully extended. The upwardly extending wall 36 and divider wall 38 separate air flows as previously described to and from the air conditioning unit 22. Beneath the ceiling template assembly 32 is the modular air grill 60 which includes a frame 61. The modular air grill 60 may be formed of various materials, including for instance plastic and is generally rectangular in shape although various shapes may be utilized. The exemplary frame 61 includes four sides wherein two opposed define a location for removable positioning of a return grill 50 and a first modular grill or supply grill 80. When the supply grill 80 is removed, a blank 180 may be installed in the frame 61 instead. The frame 61 includes a peripheral lip extending about the periphery to conceal the template assembly 32. The modular air grill 60 includes the first opening 62 and the second opening 64 both of which correspond respectively to the opening 35 and the opening 37 of the ceiling template assembly 32. The first opening 62 allows for air to move from the air conditioning unit 22 to the interior of the vehicle 10 while the second opening 64 allows for return air from the interior of the vehicle to move to the air conditioning unit 22. The second opening 64 may include one or more frame members 66 which provide support for an air filter, for example. On the opposite side, the first opening 62 allows for positioning of a removable register 80 with a plurality of moveable louvers 88. The frame 61, grill 80 and louvers 88 may be integrally molded in a plastic or other materials. The grill 60 may be sealed when the plurality of louvers are closed or allow airflow when the louvers are open. The modular air grill 60 is generally planar with a flange about a periphery thereof.

1. Beneath the ceiling template assembly 32 is the modular air grill 60 which includes a frame 61. The modular air grill 60 may be formed of various materials, including for instance plastic and is generally rectangular in shape although various shapes may be utilized. The exemplary frame 61 includes four sides wherein two opposed define a location for removable positioning of a return grill 50 and a first modular grill or supply grill 80. When the supply grill 80 is removed, a blank 180 may be installed in the frame 61 instead. The frame 61 includes a peripheral lip extending about the periphery to conceal the template assembly 32. The modular air grill 60 includes the first opening 62 and the second opening 64 both of which correspond respectively to the opening 35 and the opening 37 of the ceiling template assembly 32. The first opening 62 allows for air to move from the air conditioning unit 22 to the interior of the vehicle 10 while the second opening 64 allows for return air from the interior of the vehicle to move to the air conditioning unit 22. The second opening 64 may include one or more frame members 66 which provide support for an air filter, for example. On the opposite side, the first opening 62 allows for positioning of a removable register 80 with a plurality of moveable louvers 88. The frame 61, grill 80 and louvers 88 may be integrally molded in of a plastic or other materials. The grill 60 may be sealed when the plurality of louvers are closed or allow airflow when the louvers are open. The modular air grill 60 is generally planar with a flange about a periphery thereof.

The first opening 62 is bounded by tracks 67 allowing the register 80 to be moved into or out of the modular air grill frame 61. The frame 61 includes a plurality of fastener apertures 63 allowing for access to bolts 44. The bolts 44 tighten against and pass through aperture 46 in a structural member, but various embodiments may be utilized. The bolts 44 therefore pass to the template 32 for tightening and on to the air conditioning unit 22. Also shown from this view is a plurality of screw tabs 65. These screw tabs 65 are recessed from the lower most surface of the frame 61 to allow for screws to be hidden when the modular air grill 60 is fully assembled. The screw tabs 65 allow for screw heads to be positioned above or hidden from view from a return register or the air grill 80. The recessed tabs 65 reduce a problem in prior art devices wherein exposed screw heads had to be covered with plastic elements which were prone to fall out or be lost if maintenance was performed on the modular air grill 60. Additionally, removal of such plastic elements was difficult and sometimes resulted in scarring of the plastic part. Instead the movable registers 50, 80 cover the tabs 65 and associated fasteners.

In the embodiment depicted, the removable air grill 80 is utilized when quick cooling is desired directly beneath the area where the ceiling template assembly 32 and modular air grill 60 are located. The air grill 80 comprises a plurality of movable louvers 88 which may be opened to allow downward flow of air rather than air passing laterally through the duct work 76 into the ducts 72, 74. This provides for a quick cooling process where all of the cooling air is localized in generally one location of the RV 10. The louvers 88 may take various forms including ball louver, sliding damper, aircraft style and various other forms, for example.

The grill 80 includes a plurality of sides 82 and a lip 84 along one edge. Sides 82 include tracks which correspond to the tracks 67 of the frame 61. This allows removal and changing of the supply grill or register 80. The tracks 67 are merely one embodiment though as various other designs may be utilized to provide movement into and out of the frame 61. The lip 84 may have lateral grooves 86 which receive rib 85 on the frame 61. Such ribs 85 provide a detent or snap feature which either locks the grill 80 in the frame 61, or alternatively must be overcome by force in order to remove the grill 80 or properly position the grill 80 in the modular air grill frame 61. The detent or snap lock indicates to a user when the register 80 is properly positioned in the frame 61. The air grill 80 also includes a plurality of movable louvers 88 which allow some limited control of air flow by providing an adjustable restriction and forcing some air to the peripheral registers 75. By closing the louvers 88, the static pressure increases in the plenum 76 forcing the air to the ducts 72, 74. Alternatively, by opening the louvers 88, the static pressure in the plenum 76 decreases and the air passes through the louvers 88 to the area beneath the modular air grill 60.

According to the depicted embodiments, the modular air grill includes a return register 50 which is also removable and covers the second aperture 64. The register 50 is also generally rectangular, however various shapes may be utilized. Similarly the register 50 may be formed of various materials while the exemplary embodiment is formed of plastic. Moreover, the register 50 is removable at least in part to access an air filter interiorly positioned within said register 50. The filter inhibits dirt buildup on the evaporator and other component surfaces within the air conditioning unit 22, which leads to decreased cooling performance and capacity over time. The register 50 includes a plurality of edges 52 which engage tracks 69 of the frame 61. The edges 52 also define a recess wherein the air filter may be seated. The corresponding tracks defining edges 52 may be any type of feature which allows movement of the register 50 into and out of the frame 61. Along one edge of the register 50 is a lip 54 which engages the frame 61 in a manner similar to the supply register 80. Various features may be utilized to provide the locking detent function of the edge. The register 50 includes a plurality of apertures 56 allowing air flow from the RV interior toward the plenum 76 and into the air conditioning unit 22. Also, as with the supply register 80, the return register 50 may cover fastener tabs 65 of the frame 61 in order to hide fasteners retaining the frame 61 to the ceiling and ceiling template assembly 32.

Also depicted in FIG. 4 are locking tabs 53, 83. These tabs are located on opposed edges of the return register 50, register 80 and blank 180. The tabs 53, 83 engage opposed edges of the opposed register or blank. The locks provide a positive feedback mechanism allowing a user to know that the structures are locked in place. Further, the locking tabs require the user to overcome the locking feature in order to remove either the return register 50, the first modular register 80 or the blank 180. Since the registers 50, 80, 180 are formed of a slightly flexible material, the flexibility is of a nature to allow release of the locking tabs 53, 83.

With reference now to FIG. 5, a second embodiment of the modular air grill 60 is depicted with the ceiling template assembly 32. The modular air grill 60 and a blank 180 are of the same shape as the grill 80, having four sides and a lip 184. The forward edge closest opposite edge of register 50 includes tabs 183 for locking engagement with register 50. The blank 180 may be opaque, translucent or a clear material. The blank 180 also includes tracks along the lateral sides 182 which correspond to the tracks 67 previously described. The blank 180 is engaged by ribs 185 to retain the blank 180 in place as previously discussed. The blank 180 is usable as a substitute to the register 80 which has the plurality of vanes 88. The blank 180 has no apertures to inhibit air from passing through the blank 180. This in turn forces all of the air through the plenum 76 to the lateral first and second ducts 72, 74. Thus, when quick cooling is complete with the air grill 80, the blank 180 may be utilized to provide continuous cooling through the periphery of the RV as normal mode of cooling. Additionally, the user may desire to switch between cooling modes as desired and has the ability to do so by replacement of the blank 180 or grill 80. Further, the use of the grill 80 and the blank 180 allows sales of two assembly models whereas some customers prefer continual use of the blank 180 and some customers prefer the use of the louvered grill 80.

Figure 6:
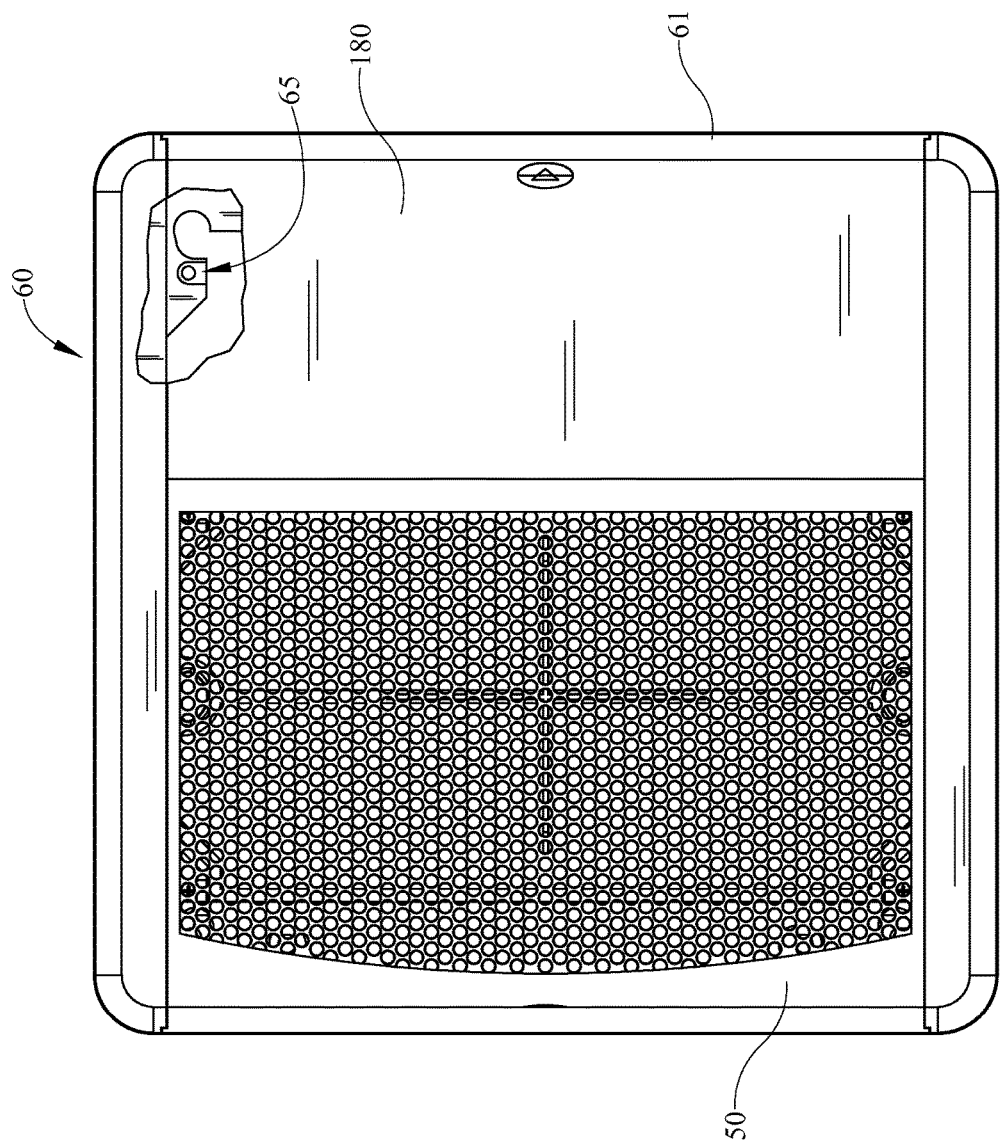
FIG. 6 is an assembly bottom view of the modular air assembly according to the second embodiment of FIG. 5.

Referring now to FIG. 6, a bottom view of the modular air grill 60 is depicted from below with the blank 180 positioned within the frame 61. The blank 180 is shown in a closed position which causes the air flow to move through plenum 76 and out to the first and second ducts 72, 74 (FIG. 3). Opposite the blank 180 is a register having a plurality of apertures to allow air flow to move from the interior of the RV 10 through the modular air grill and into the air conditioning unit 22 for returning from the air conditioning unit and leading through the ducts 72, 74. When the alternate grill 80 is utilized, air is allowed to pass down through the location where blank 180 is depicted and cool a single area.

Figure 7:
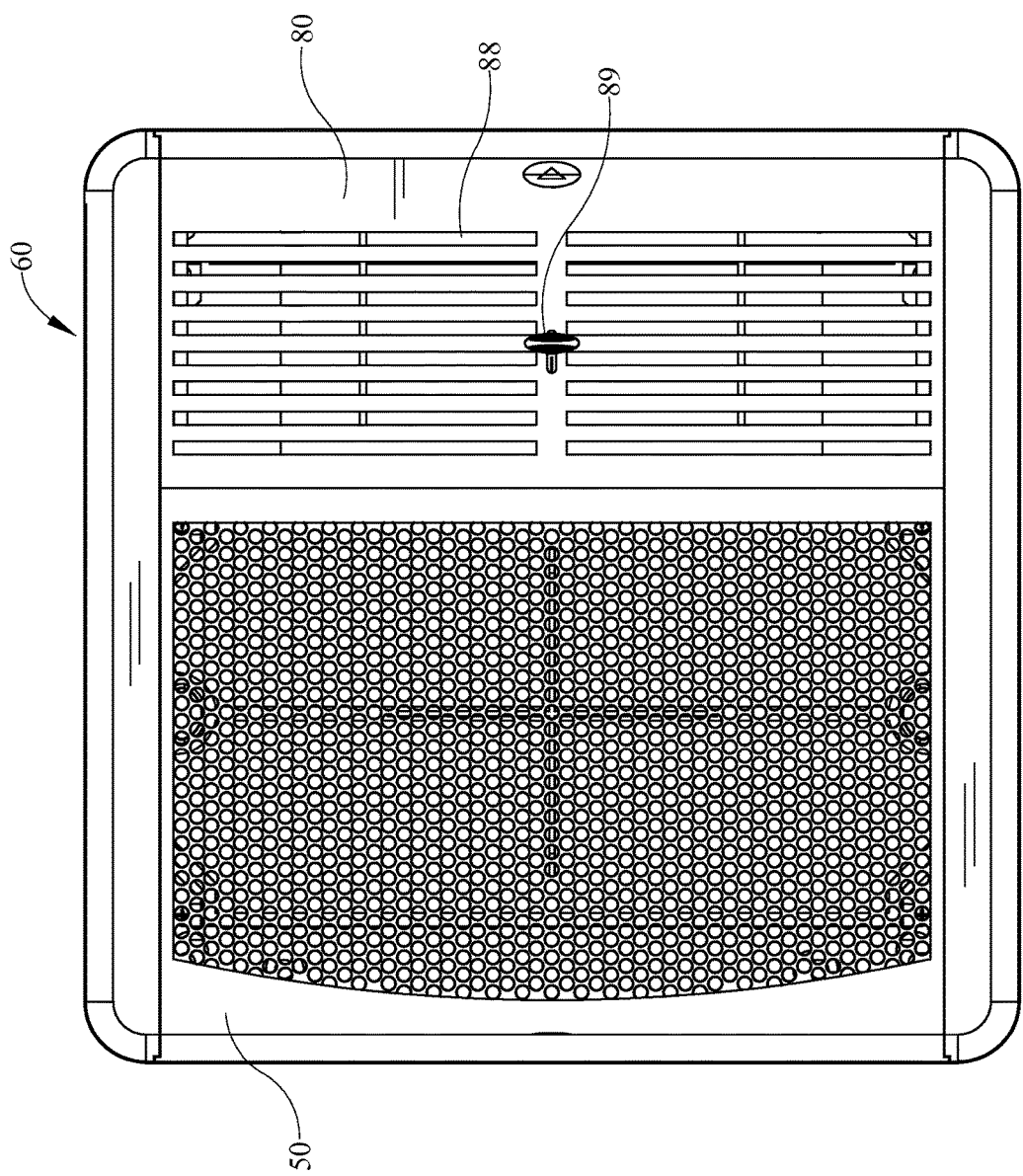
FIG. 7 is an assembled bottom view of the modular air assembly according to the first embodiment of FIG. 4; and, FIG. 8 is an exemplary side section view with various feature options depicted schematically.

Referring to FIG. 7, a bottom view of the modular air grill 60 is depicted with the blank 180 removed and the louvered grill 80 in position. The louvers 88 (FIG. 4) may be adjusted with a slider 89 between an open position and a partially closed or a fully closed position. Additionally, with the registers 50, 80 in position, the tabs 65 are hidden from view. As previously discussed, this alleviates the need for plastic pieces to cover the fasteners.

Figure 8:
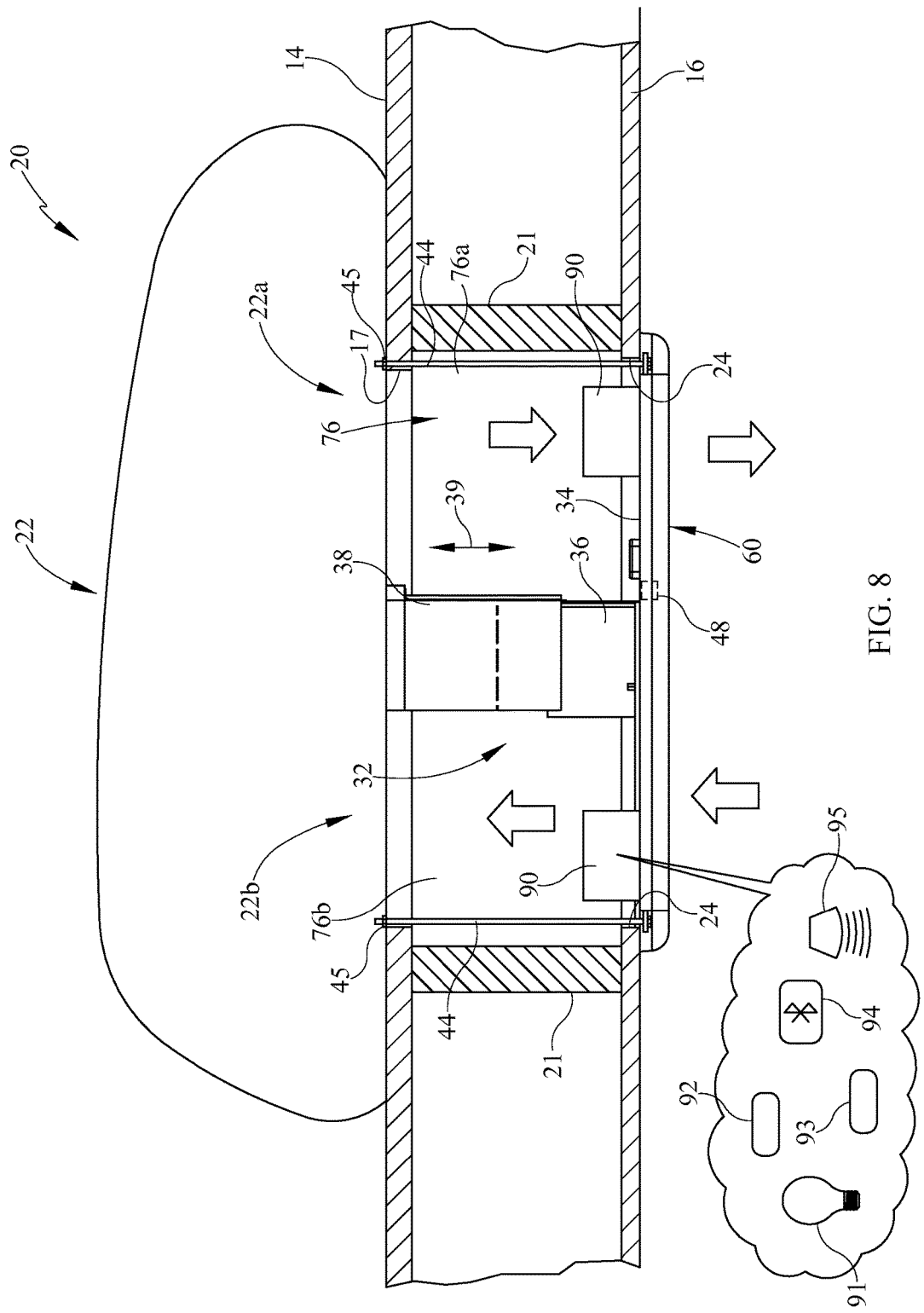

Referring now to FIG. 8, a side section view of the modular air grill assembly is depicted. The modular grill 60 may also have a plurality of modular features 90 which may be disposed above one of the grill 80, the blank 180 or the return grill 50. For example, when the blank 180 is in position, and if the blank is formed of a clear or translucent material, a light 91 may be positioned in this plenum area 76a. Alternatively, a motion sensor with a light 95 may be installed in the plenum 76 above the grills 50, 80 or blank 180. Additionally or alternatively, these areas may further comprise features such as materials containing insect repellent 92 and or air purifiers or fresheners 93. As a further alternatively or addition, the plenum area may be fitted with a communications controller 94, such as Bluetooth or ZIG-BEE module for communication between appliances and with apps of smartphones, computers or tablets. Additional features may include, but are not limited to an FM Transmitter or a digital electronic control panel installed on any of the removable blanks or grills or in replacement thereof.

In operation, the air conditioning units 22 are started so as to remove warm air from the RV interior through plenum section 76b and supply conditioned air to the interior through plenum section 76a. To initially provide a quick cooling, for example if the vehicle has been empty for a lengthy period of time in the heat, the quick cool register 80 may be utilized to allow cool air to flow directly downward through the modular air grill 60 to a specific zone beneath the modular air grill.

After a desired amount of cooling has occurred, the louvered register 80 may be removed. Instead, the blank 180 may be installed which precludes air from moving down through the modular grill 60. This forces air flow out through ducts 72, 74 and to the registers 75 spaced about the RV.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

What is claimed is:

1. A modular air grill assembly for use with an air conditioning system, having a roof-mounted air conditioning unit, comprising:
    a ceiling template capable of mounting at a ceiling opening of a recreation vehicle (RV), said ceiling opening defining a lower boundary of a plenum extending between said ceiling and said roof, said plenum defining a flow communication path between said air conditioning unit and said lower boundary;
    said ceiling template having a first opening, a second opening and a divider wall, said first opening being in fluid communication with a supply of said air conditioning unit and said second opening being in fluid communication with a return of said air conditioning unit;
    a modular air grill disposed at said ceiling over said plenum and engaging said ceiling template, said modular air grill having a first opening corresponding to said first opening of said template and a second opening corresponding to said second opening of said template;
    a first modular register having a movable louver, which is positionable in said modular air grill corresponding to said first opening of said modular air grill and a modular blank which is positionable in said modular air grill corresponding to said first opening of said modular air grill, said first modular register and said modular blank being interchangeably mounted in said modular air grill.

2. The modular air grill assembly of claim 1, said first modular register and said modular blank being disposed generally perpendicular to air flow from said supply.

3. The modular air grill assembly of claim 1, said first modular register and said modular blank being disposed on a supply side of said plenum.

4. The modular air grill assembly of claim 1 further comprising a modular return register.

5. The modular air grill assembly of claim 4 further comprising a plurality of locking elements extending from said modular return register, from said first modular register and from said modular blank.

6. The modular air grill assembly of claim 1 further comprising a feature module disposed in one of said modular return register, said modular blank and said first modular register.

7. The modular air grill assembly of claim 6, said features including at least one of a communication feature, a light, a motion sensor, a motion sensor with light, an insect repellent material and an air purifier or freshener.

8. The modular air grill assembly of claim 7, wherein said communication feature includes Bluetooth communications.

9. The modular air grill assembly of claim 7 wherein said communication feature includes an electronic control panel.

10. The modular air grill assembly of claim 7 wherein said communication feature includes a transmitter.

11. The modular air grill assembly of claim 1 further comprising a plurality of hidden screw tabs covered by a first modular return register and said one of said first modular register and said modular blank.

12. The modular air grill assembly of claim 1 further comprising a plurality of louvers integrally molded in said first modular register.

13. The modular air grill assembly of claim 12 wherein said first modular register is molded of a plastic material.

14. The modular air grill assembly of claim 12 wherein said modular air grill is generally planar with a flange about a periphery thereof.

* * * * *